United States Patent
Tsyganok et al.

(10) Patent No.: US 9,282,133 B2
(45) Date of Patent: Mar. 8, 2016

(54) COMMUNICATING CONTROL INFORMATION WITHIN A REAL-TIME STREAM

(71) Applicant: Ooma, Inc., Palo Alto, CA (US)

(72) Inventors: Vadim Tsyganok, Moraga, CA (US); William M. Gillon, San Mateo, CA (US); Hai Lei, Ottawa (CA); Tobin E. Farrand, Burlingame, CA (US); David A. Bryan, Cedar Park, TX (US)

(73) Assignee: Ooma, Inc., Palo Alto, CA (US)

( * ) Notice: Subject to any disclaimer, the term of this patent is extended or adjusted under 35 U.S.C. 154(b) by 0 days.

(21) Appl. No.: 14/626,837

(22) Filed: Feb. 19, 2015

(65) Prior Publication Data

US 2015/0244761 A1 Aug. 27, 2015

Related U.S. Application Data

(63) Continuation-in-part of application No. 14/105,014, filed on Dec. 12, 2013.

(51) Int. Cl.
  *G06F 11/00* (2006.01)
  *H04L 29/06* (2006.01)
  *H04L 29/08* (2006.01)
  *G06F 11/08* (2006.01)

(52) U.S. Cl.
  CPC .............. *H04L 65/608* (2013.01); *G06F 11/08* (2013.01); *H04L 67/32* (2013.01)

(58) Field of Classification Search
  CPC ........................ H04L 65/608; H04L 67/32
  See application file for complete search history.

(56) References Cited

U.S. PATENT DOCUMENTS

| 6,707,819 | B1 * | 3/2004 | Fraser et al. ............... 370/395.1 |
| 2003/0037299 | A1 | 2/2003 | Smith |
| 2004/0015765 | A1 | 1/2004 | Cooper et al. |
| 2005/0102371 | A1 * | 5/2005 | Aksu ............................. 709/217 |
| 2008/0184081 | A1 | 7/2008 | Hama et al. |
| 2010/0332923 | A1 | 12/2010 | D'Abreu et al. |
| 2012/0192031 | A1 | 7/2012 | Liu et al. |

(Continued)

FOREIGN PATENT DOCUMENTS

WO   2013127459 A1   9/2013

OTHER PUBLICATIONS

Allman et al. TCP Congestion Control, IETF RFC 5681, Sep. 2009, Internet Engineering Taskforce.

(Continued)

*Primary Examiner* — Sam Rizk

(74) *Attorney, Agent, or Firm* — Van Pelt, Yi & James LLP

(57) ABSTRACT

Providing control information is disclosed. A real-time streaming communication channel is established with a communication party using a real-time streaming protocol. It is determined that control information is to be provided to the communication party. The control information is encapsulated using the real-time streaming protocol. The encapsulated control information is marked as including control information content. Streaming content is provided to the communication party via the real-time streaming communication channel using the real-time streaming protocol. The marked encapsulated control information is provided via the real-time streaming communication channel.

20 Claims, 10 Drawing Sheets

(56) References Cited

U.S. PATENT DOCUMENTS

2012/0259989 A1 10/2012 Cousins
2013/0160070 A1 6/2013 Ladd et al.

OTHER PUBLICATIONS

Perkins et al. RTP Payload for Redundant Audio Data, IETF RFC 2198, Sep. 1997, Internet Engineering Taskforce.
Schulzrinne et al. RTP: A Transport Protocol for Real-Time Applications, IETF RFC 3550, Jul. 2003, Internet Engineering Taskforce.
Schulzrinne et al. RTP Profile for Audio and Video Conferences with Minimal Control, IETF RFC 3551, Jul. 2003, Internet Engineering Taskforce.
Handley et al. SDP: Session Description Protocol, IETF RFC 4566, Jul. 2006, Internet Engineering Taskforce.
Rosenberg et al. SIP: Session Initiation Protocol, IETF RFC 3261, Jun. 2002, Internet Engineering Taskforce.
Schulzrinne et al. Real Time Streaming Protocol (RTSP), IETF RFC 2326, Apr. 1998, Internet Engineering Taskforce.
RTCWEB Working group, works in progress, May 3, 20111, Internet Engineering Taskforce.
Parmar et al. Adobe's Real Time Messaging Protocol (RTMP) Specification, Adobe Specification, Dec. 21, 2012.
ISO/IEC 23009-1:2014, Dynamic Adaptive Streaming over HTTP (DASH), International Organization for Standardization. Wikipedia. Adobe. Page last modified on Feb. 20, 2015, at 14:44.
Uberti et al. Javascript Session Establishment Protocol draft-uberti-rtcweb-jsep-02. Feb. 16, 2012: https://tools.ietf.org/id/draft-uberti-rtcweb-jsep-02.txt.
Thomson et al. Gaining and Maintaining Consent for Real-Time Applications draft-thomson-rtcweb-consent-00. Nov. 20, 2013: https://tools.ietf.org/id/draft-thomson-rtcweb-consent-00.txt.
E. Rescorla. Security Considerations for RTC-Web draft-rescorla-rtcweb-security-01. Sep. 4, 2011: https://tools.ietf.org/id/draft-rescorla-rtcweb-security-01.txt.
Perkins et al. RTP Requirements for RTC-Web draft-perkins-rtcweb-rtp-usage-03. Aug. 28, 2011: https://tools.ietf.org/id/draft-perkins-rtcweb-rtp-usage-03.txt.
Perumal et al. STUN Usage for Consent Freshness draft-muthu-behave-consent-freshness-04. Jul. 15, 2013: https://tools.ietf.org/id/draft-muthu-behave-consent-freshness-04.txt.
Marjou et al. WebRTC audio codecs for interoperability with legacy networks. draft-marjou-rtcweb-audio-codecs-for-interop-01. Feb. 25, 2013: https://toolsietf.org/id/draft-marjou-rtcweb-audio-codecs-for-interop-01.txt.
Dhesikan et al. DSCP and other packet markings for RTCWeb QoS draft-jennings-rtcweb-qos-00. Jul. 9, 2012: https://tools.ietf.org/id/draft-jennings-rtcweb-qos-00.txt.
Bran et al. WebRTC Codec and Media Processing Requirements draft-cbran-rtcweb-codec-02. Mar. 12, 2012: https://tools.ietf.org/id/draft-cbran-rtcweb-codec-02.txt.
H. Alvestrand. Overview: Real Time Protocols for Browser-based__ Applications draft-alvestrand-rtcweb__overview-01. Jun. 20, 2011: https://tools.ietf.org/id/draft-alvestrand-rtcweb-overview-01.txt.
Dhesikan et al. DSCP and other packet markings for RTCWeb QoS draft-ietf-rtcweb-qos-00. Oct. 15, 2012 https://tools.ietf.org/html/draft-ietf-rtcweb-qos-00.

* cited by examiner

COMMUNICATING CONTROL INFORMATION WITHIN A REAL-TIME STREAM

CROSS REFERENCE TO OTHER APPLICATIONS

This application is a continuation in part of co-pending U.S. patent application Ser. No. 14/105,014 entitled REDUNDANT ENCODING filed Dec. 12, 2013, which is incorporated herein by reference for all purposes.

BACKGROUND OF THE INVENTION

Real-time streaming connections such as connections utilized for voice or video communication and other time sensitive data may be transmitted over unreliable networks such as IP networks, cellular networks, wireless networks, and the Internet. Data packets may be lost while being sent through the network. Often a different communication connection is established to send control information regarding the real-time streaming connection. For example, an "out-of-band" communications mechanism may be utilized to send periodic reports and instructions back and forth, allowing senders and receivers to understand how well the information is flowing between them and adjust parameters of the connection accordingly.

Unfortunately, because the control information is provided out of band, it is often stripped by intermediate devices in the network such as network address translators (NATs), firewalls, or other security devices. Each device traversed across a network increases the likelihood the control information will not reach end-to-end. Even when the control information is not stripped before reaching a remote party, the process of providing periodic reports about a different connection is excessively complex. Thus in many implementations, control information is not utilized and results in poor real-time streaming performance. Therefore, there exists a need for a better way to provide real-time streaming control information.

BRIEF DESCRIPTION OF THE DRAWINGS

Various embodiments of the invention are disclosed in the following detailed description and the accompanying drawings.

DETAILED DESCRIPTION

Figure 1:
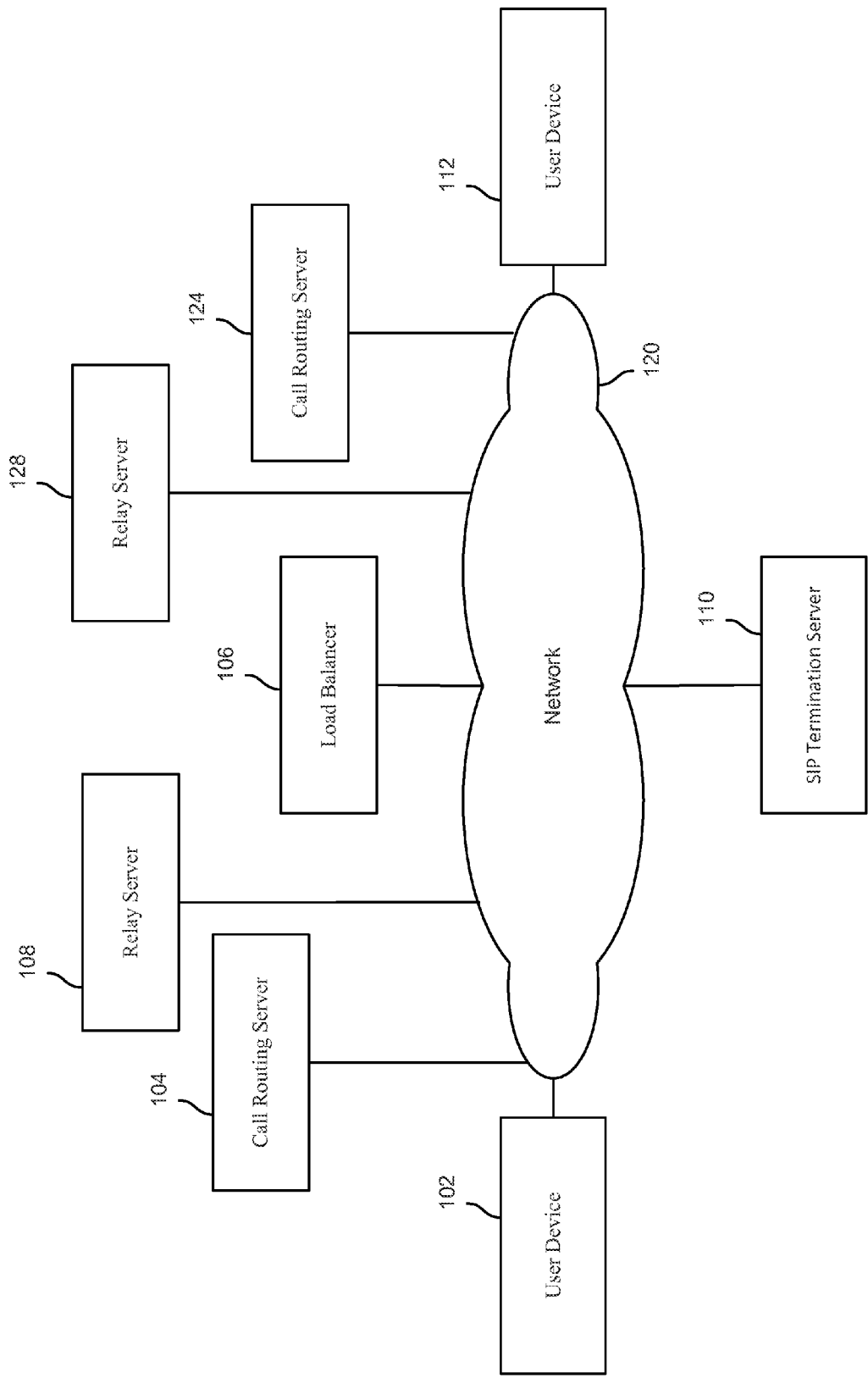
FIG. 1 is a block diagram illustrating an embodiment of a data transmission environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing real-time streaming control information is disclosed. In some embodiments, a real-time streaming communication channel is established with a communication party using a real-time streaming protocol. For example, a Real-time Transport Protocol (i.e., RTP) communication channel is established with a remote communication party of the communication channel. The communication party is provided streaming content via the real-time streaming communication channel using the real-time streaming protocol. For example, real-time voice communication streaming content is provided via the real-time streaming communication channel using the RTP protocol. It is determined that control information is to be provided to the communication party. For example, it is determined that information that includes one or more of the following types of information about the real-time streaming communication channel (e.g., status, performance metric, command, instruction, request, configuration, metadata, etc.) is to be provided to the remote communication party. The control information is encapsulated using the real-time streaming protocol. For example, although the control information is typically encoded in a different control protocol to be sent using a separate out-of-band communication channel, the control information is encapsulated using a mechanism of the real-time streaming protocol to be sent via the real-time streaming communication channel rather than a separate communication channel. The encapsulated control information is marked as including control information content. For example, an identifier that identifies encapsulated control information as control information is included in content to be provided along with the encapsulated control information.

The marked encapsulated control information is sent via the real-time streaming communication channel.

In some embodiments, a desire redundancy level is provided as control information. For example, error events are tracked over an interval of time. The error events are classified based on a number of errors included in each event. For example, network packet loss is tracked by a receiver and for each group of one or more consecutive packet losses, the number of packet losses in the group is tracked. A desired level of error event to correct in order to maintain an acceptable rate of uncorrected errors is determined. For example, the number of consecutive packet losses to be able to be corrected to achieve a desired correction rate is determined. A redundancy level is determined so that error events corresponding to the desired level of error event or a lower level of error event are corrected. For example, a real-time streamed audio is desired to be reliably transmitted and each audio data frame of the streamed audio is duplicated a number of times based on the number of consecutive packet losses to be able to be corrected in real-time and the duplicated audio frames are sent in different network data packets.

FIG. 1 is a block diagram illustrating an embodiment of a data transmission environment. For example, FIG. 1 illustrates a Voice over Internet Protocol (VOIP) environment. User device 102 desires to send data to user device 112. For example, user device 102 desires to make an audio call with user device 112. Examples of user device 102 and user device 112 include a mobile device, a smart phone, a tablet computer, a wearable computer, a watch, a vehicle computer, an optical head-mounted display device, a desktop computer, a laptop computer, a telephone, an IP phone, a video conferencing device, a conference telephone, and any other communication or computing device.

User device 102 contacts call routing server 104 via network 120 to indicate a desire to establish communication (e.g., live real-time communication such as a VOIP phone call and video call). For example, an identifier of a desired communication party is provided to call routing server 104. Call routing server 104 determines how to establish the desired communication. In some embodiments, communication is sent directly from user device 102 to user device 112. In other cases one of more additional call routing server 124, load balancer 106, relay servers 108 and 128 or SIP termination server 110 will be required.

In the event it is required, call routing server 104 contacts load balancer 106 to allocate an audio relay server for the communication and load balancer 106 selects the optimal server for the communication. In some embodiments, load balancer 106 selects an audio relay server based at least in part on one or more of the following: a geographical proximity to a device initiating the communication, a geographical proximity to a user device receiving the communication, network topology, network capacity, an available capacity of an audio relay server, and a connection speed to an audio relay server. For example, the geographically closest audio relay server with available capacity is selected. In some embodiments, a plurality of audio relay servers is connected to network 120. In the example of FIG. 1, relay server 108 has been selected as the relay server to be utilized by user device 102.

In the event the desired communication of device 102 is a communication with a Plain Old Telephone Service (POTS) device (e.g., device addressable with a POTS number) and/or communication via a public switched telephone network (PSTN), call routing server 104 signals to SIP Termination Server 110, using Session Initiation Protocol (SIP), the desired communication to be established. SIP Termination Server 110 attempts to establish the communication session with the desired communication party. For example, SIP Termination Server 110 provides communication services to user device 112 and enables user device 112 to send and receive data to user device 102 via SIP Termination Server 110 and audio relay server 108.

In the event the desired communication of device 102 is a communication with another user device that is reachable directly via one or more audio relay servers (e.g., audio relay servers of a single entity providing the communication service to device 102), call routing server 104 attempts to contact a call routing server of the communication recipient (e.g., call routing server 124 assigned to communication recipient user device 112). Call routing server 124 contacts load balancer 106 to allocate an audio relay server for the communication and load balancer 106 selects the optimal server for the user device 112. In some embodiments, load balancer 106 selects an audio relay server based at least in part on one or more of the following: a geographical proximity to a device initiating the communication, a geographical proximity to a user device receiving the communication, network topology, network capacity, an available capacity of an audio relay server, and a connection speed to an audio relay server. For example, the geographically closest audio relay server to user device 112 with available capacity is selected. In some embodiments, a plurality of audio relay servers is connected to network 120. In the example of FIG. 1, relay server 128 has been selected as the relay server to be utilized by user device 112.

The selected relay server 108 relays communication between user device 102 and user device 112 via network 120 and either SIP Termination Server 110 or audio relay server 128. For example, audio communication from user device 102 is sent to audio relay server 108 and audio relay server 108 sends the audio communication to SIP Termination Server 110 or another server instructed by SIP Termination Server 110 to handle the communication for a user of SIP Termination Server 110. In another example, audio communication from user device 102 is sent to audio relay server 108 and audio relay server 108 sends the audio communication to audio relay server 128 to allow audio relay server 128 to send the audio communication to user device 112 via network 120. In some embodiments, a single audio relay server handles communication between user device 102 and user device 112 via network 120. User device 112 may provide data to user device 102 via the same servers and/or channels utilized by user device 102 to provide data to user device 112. For example, communication data from user device 112 is provided to user device 102 via SIP Termination Server 110 and relay server 108. In another example, communication data from user device 112 is provided to user device 102 via relay server 128 and relay server 108.

Communication between devices via network 120 may not be reliable. For example, communication may be sent in packets and the packet may become corrupted and/or lost. In some embodiments, data communication redundancy is desired between user device 102 and audio relay server 108, between audio relay server 108 and audio relay server 128, between an audio relay server and SIP Termination Server 110 or another server instructed by SIP Termination Server 110 to handle the communication for a user of SIP Termination Server 110, and/or between user device 112 and audio relay server 128. For example, real-time communication such as audio or video streaming/communication data is desired to be sent redundantly between devices to guarantee a communication quality level.

One or more of the following may be included in network 120: a direct or indirect physical communication connection, mobile communication network, Internet, intranet, Local Area Network, Wide Area Network, Storage Area Network, a wireless network, a cellular network, PTSN, and any other form of connecting two or more systems, communication devices, components, or storage devices together. Although example instances of components have been shown to simplify the diagram, additional instances of any of the components shown in FIG. 1 may exist. Any of the components shown in FIG. 1 may be physically integrated in a single hardware component or may represent a plurality of hardware components. In some embodiments, one or more of the components shown in FIG. 1 may be directly connected to each other rather than being connected via network 120. Components not shown in FIG. 1 may also exist.

Figure 2:
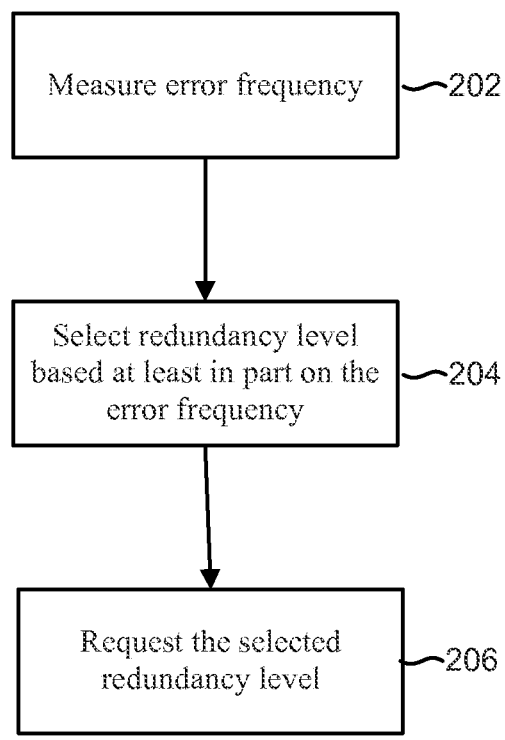
FIG. 2 is a flowchart illustrating an embodiment of a process for selecting a redundancy level.

FIG. 2 is a flowchart illustrating an embodiment of a process for selecting a redundancy level. At least a portion of the process of FIG. 2 may be implemented on user device 102, relay server 108, relay server 128, and/or user device 112. For example the process of FIG. 2 is used by a receiver of data to select and request a redundancy level based on an observed error rate. The process of FIG. 2 may be performed periodically and/or dynamically to update a desired redundancy level.

At 202, error frequency is measured. In some embodiments, the measured error frequency includes network error frequency. Traditionally communication error has been measured as a total packet loss percentage. For example, total number of packets lost during a time interval has been traditionally measured and reported as a measure of network quality. However, for certain types of data, simply measuring the total number of packets lost may not sufficiently capture a desired quality attribute of the network. For example, a simple total 10% packet loss statistic is unable to distinguish between one network packet being lost for every tenth packet or ten packets being lost in a row for every 100 packets. For certain types of data such as voice, video, streaming data, and/or live/real-time data, it may be important that long periods of consecutive errors do not occur. For example, a recipient of a voice phone call may be able to understand a voice audio stream that is missing one of every ten voice audio packets, but a consecutive loss of ten packets may result in an entire loss of a word included in the voice audio stream.

In some embodiments, the error events are classified based on a number of errors included in each event. In some embodiments, measuring the error frequency includes tracking the number of consecutive data segments that have become lost or corrupted during data transmission through a network. For example, the number of consecutive network data packets that have become lost or corrupted is measured. Each network data packet may include one or more segments of data such as frames of an audio data. In some embodiments, error events are tracked over an interval of time. The interval of time may be a dynamically determined and/or predetermined periodic amount of time. In some embodiments, each error event may be associated with one or more sequentially consecutive network packets. For example, a group of consecutive network packets that have become lost or corrupted is classified as a single error event. In some embodiments, measuring the error frequency includes tracking the number of packets included in each error event. For example, a table or other data structure is used to tally, for each group of one or more sequentially consecutive error network packets, the number of packets included in the group. This may allow one to determine how many consecutive network packets are likely affected when a network transmission error event occurs.

At 204, a redundancy level based at least in part on the error frequency is selected. In some embodiments, selecting the redundancy level includes determining a desired level of error event to be able to be corrected in order to maintain an acceptable rate of uncorrected errors. For example, the number of consecutive errors (e.g., consecutive packet loss/corruptions) to be able to be corrected to achieve a desired correction rate is determined. A redundancy level is determined so that error events corresponding to the desired level of error event or a lower level of error event are corrected. For example, a VOIP call is desired to be reliably transmitted and each audio data frame of the streamed audio is duplicated a number of times based on the number of consecutive packet losses to be able to be corrected and the duplicated audio frames are sent in different data packets.

In some embodiments, a distribution of the number of errors (e.g., number of packets) included in error events measured in 202 is utilized to select a number such that the number of error events with number of errors greater than the selected number is less than or equal to a threshold value. For example, for a distribution of number of errors (e.g., two error events with only one consecutive error packet, seven error events with two consecutive error packets, and three error events with three consecutive error packets), "2" is selected as the number of errors to be able to be corrected such that the number of error events with number of error events greater than the selected number (e.g., three error events with errors greater than two) is less than or equal to a threshold value (e.g., threshold value of three).

In some embodiments, a distribution of the number of errors (e.g., number of packets) included in error events measured in 202 is utilized to select a number such that the percentage of error events with number of errors greater than the selected number is less than or equal to a threshold percentage. For example, for a distribution of number of errors (e.g., two error events with only one consecutive error packet, seven error events with two consecutive error packets, and three error events with three consecutive error packets), "2" is selected as the number of errors to be corrected such that the percentage of error events with number of errors greater than the selected number (e.g., 30% error events with errors greater than two) is less than or equal to a threshold percentage (e.g., threshold 30%).

In some embodiments, selecting the redundancy level includes utilizing a plurality of measured error frequencies. For example, for each of a plurality of measured error frequencies over different time intervals (e.g., the time intervals may or may not overlap), a value is determined and the determined values are weighted and/or averaged to determine a single value utilized at least in part to select the redundancy level. In some embodiments, selecting the redundancy level includes utilizing a total error rate over a time interval. For example, total number of packet lost over a time interval and a statistical distribution of the number of consecutive error packets included in each error event over the same time interval are utilized to select the redundancy level.

In some embodiments, selecting the redundancy level includes determining a number of duplicate copies of the same data desired to be transmitted by a sender. For example, a number of duplicate audio frames of an audio communication desired to be transmitted by a transmitter is determined (e.g., number of duplicate audio frames to be transmitted by relay server 108 to user device 102 of FIG. 1 when relay server 108 is sending audio data to user device 102). For example, if "2" is selected as the number of consecutive network packet errors to be able to be corrected, two additional (e.g., three total) packets with duplicate data are desired to be sent by the transmitter by selecting a redundancy level of three, allowing one packet to be received even if two of the duplicate packets are lost. In some embodiments, selecting the redundancy level includes determining a number of different data segments to be included in network data packets to be provided. For example, a number of audio frames that is desired to be included in each received network packet is determined and the audio frames may be duplicated across audio frame slots of different network packets.

At 206, the selected redundancy level is requested. In some embodiments, the selected redundancy level was selected by a receiver of a communication and the receiver of the communication indicates to the sender of the communication the selected redundancy level desired to be modified in real-time. For example, when user device 102 is receiving communication, user device 102 selects a desired redundancy level and indicates it to relay server 108 and when relay server 108 is receiving communication, relay server 108 selects a desired redundancy level and indicates it to user device 102 of FIG. 1. The selected redundancy level may be also communicated between relay server 108 and relay server 128 and/or between relay server 128 and user device 112 of FIG. 1.

In various embodiments, bidirectional communication between two communication parties requires each communication party to select and request a redundancy level from the other communication party. The selected redundancy level of each communication party may not need to be the same. For example, sending and receiving bandwidth and network conditions may be different and may require different redundancy levels for the different communication direction channels between the communication parties.

In some embodiments, the requested redundancy level does not have to be honored by a sender of the communication that received the request. For example, the requested redundancy level may not be possible and/or not optimal as determined by the sender of the communication. In some embodiments, the selected redundancy level is not requested if the selected redundancy level is the same as the current redundancy level.

In some embodiments, the selected redundancy level is indicated via in-band signaling. For example, the receiver of a communication sends the request for the selected redundancy level via the same communication channel utilized to receive the communication to be adjusted. The in-band signaling may be achieved using information included in a packet header (e.g., additional header in RTP packet headers) and/or mixed into an audio stream (e.g., Session Traversal Utilities for NAT (STUN) messages mixed along with audio data frames).

In some embodiments, the selected redundancy level is indicated via out-of-band signaling. For example, the receiver of the communication sends the request for the selected redundancy level via a communication channel different from the communication channel utilized to receive the communication to be adjusted. The out-of-band signaling may be achieved using SIP (e.g., using "SIP INFO," etc.) and/or Extensible Messaging and Presence Protocol (XMPP) (e.g., using IQ stanzas, etc.). For example, the selected redundancy level is communicated between user device 102 and relay server 108 via call routing server 104 of FIG. 1. In some embodiments, the selected redundancy level is indicated via a dedicated communication channel (e.g., utilizing RTP Control Protocol (RTCP), etc.).

Figure 3:
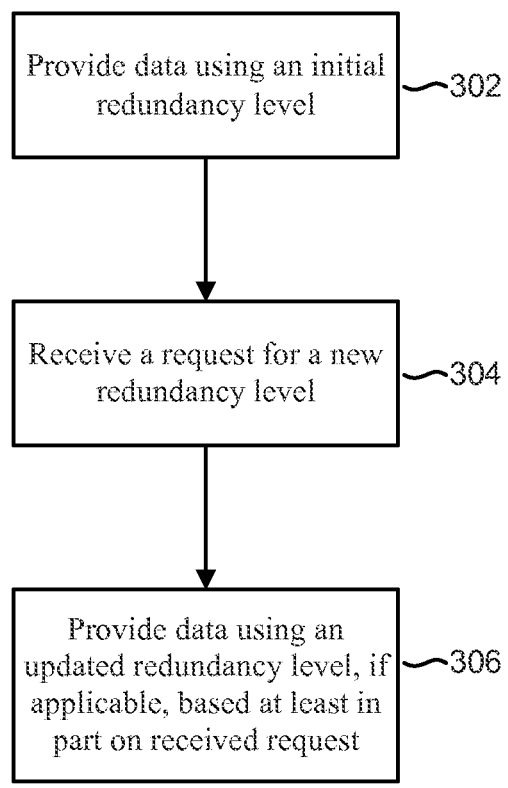
FIG. 3 is a flowchart illustrating an embodiment of a process for providing data.

FIG. 3 is a flowchart illustrating an embodiment of a process for providing data. At least a portion of the process of FIG. 3 may be implemented on user device 102, relay server 108, relay server 128, and/or user device 112. For example, the process of FIG. 3 is used by a sender of data to provide data using a requested redundancy level requested at 206 of FIG. 2.

At 302, data is provided using an initial redundancy level. In some embodiments, the initial redundancy level is a predetermined redundancy level. For example, a default initial redundancy level is utilized. In some embodiments, the initial redundancy level is selected based on a network connection parameter. For example, the initial redundancy is selected based on a type of network connection (e.g., WIFI, wired connection, or mobile network connection, etc.) utilized by a receiver and/or a sender of the data. Other examples of the network connection parameter include a type of wireless network standard being utilized (e.g., 802.11 A, B, G, N, etc.), speed of a network, a provider of a network, a mobile network standard being utilized (e.g., 3G, 2G, LTE, etc.), and a network coverage (e.g., mobile network coverage). In some embodiments, the initial redundancy level is selected based at least in part on a location identifier. For example, the initial redundancy level is determined based on a mobile network coverage associated with a determined location (e.g., determined using GPS, IP address, signal triangulation, WIFI SSID database, etc.) of a communication sender and/or receiver.

In some embodiments, the initial redundancy level is determined based at least in part on a previously determined redundancy level. For example, a previously determined redundancy level may be associated (e.g., stored in a table database) with a network address identifier (e.g., IP address, subnet, etc.), a network identifier (e.g., SSID), a location identifier, and/or an account identifier of a sender and/or a receiver, and the previously determined redundancy level may be identified and utilized for a communication using the associated identifier.

The initial redundancy level is utilized to send a communication redundantly. In some embodiments, the sending of the communication includes sending data in one or more network packets. The data to be sent is duplicated based on the redundancy level. For example, the redundancy level indicates the number of copies of the data to be sent. In some embodiments, network packets of the data include one or more segments of the data to be sent. For example, audio data to be sent is segmented into audio data frames and the number of audio data segments to be included in a single network packet to be sent is based on the redundancy level. In some embodiments, each different data segment (e.g., audio frame) is sent in different network packets and each network packet includes a plurality of data segments (e.g., audio data frames) based on the redundancy level. For example, each data segment is duplicated a number of times based on the desired redundancy level and each duplicated segment is included in a data packet along with one or more other data segments.

At 304, a request for a new redundancy level is received. In some embodiments, the request includes the request sent in 206 of FIG. 2. In some embodiments, it is determined whether the requested redundancy level should be updated to the requested redundancy level. In some embodiments, determining whether to update the redundancy level includes analyzing one or more of the following to determine whether updating the redundancy level would be optimal: a bandwidth requirement of the requested redundancy level, a bandwidth capability of a communication channel, a processing requirement of the requested redundancy level, an observed error rate, and a history of one or more previously requested redundancy levels. The requested redundancy level may not be honored. The redundancy level may be modified by a portion of the requested redundancy level or not modified.

At 306, data is provided using an updated redundancy level, if applicable, based at least in part on the received request. The redundancy level may be increased or decreased based on the request. For example, the redundancy level is set to the requested redundancy level. In some embodiments, the redundancy level is modified in part based on the requested redundancy level. For example, the redundancy level is increased or decreased by a portion of the difference between the current redundancy level and the requested redundancy level.

The data to be sent is duplicated based on the updated redundancy level. For example, the redundancy level indicates the number of copies of the data to be sent. In some embodiments, each network packet to be sent includes one or more segments of the data to be sent and the number of data segments to be included in a single packet is indicated by the redundancy level. For example, audio data is sent and the audio data is segmented into audio data frames that are duplicated and included in network packets with capacity to include a plurality of audio data frames. In some embodiments, each different data segment (e.g., audio frame) is sent in different network packets and each network packet includes a plurality of data segments (e.g., audio data frames). For example, each data segment is duplicated a number of times based on the updated redundancy level and each duplicated segment is included in a data packet along with one or more other data segments.

Figure 4:
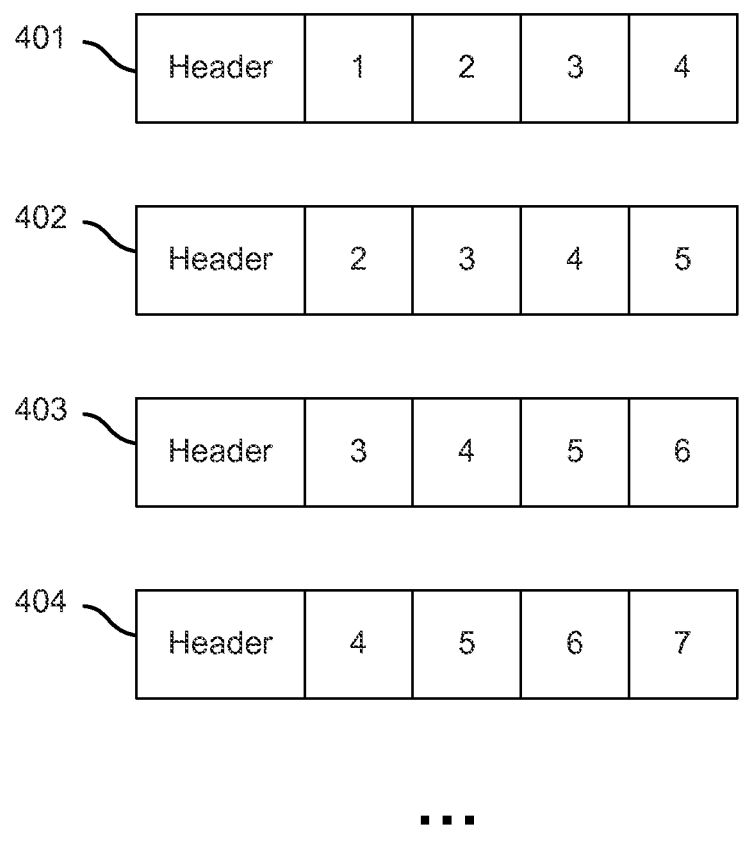
FIG. 4 is a diagram showing an example of data packets sent based on a redundancy level.

FIG. 4 is a diagram showing an example of data packets sent based on a redundancy level. In some embodiments, the data to be sent via a network is divided into sequentially numbered data segments (e.g., audio data frames). A redundancy level of "4" (e.g., four redundancy copies of the data to be sent and four data segments to be sent in each packet) is to be utilized when sending the data. Packet 401 includes header information and four sequentially numbered data segments (i.e., data segments numbers 1 through 4) of the data to be sent. In order to send four data segments in packet 401, the sender may have to delay sending of packet 401 until all four included data segments are ready to be included in the packet. After packet 401 is sent, packet 402 is sent. Packet 402 includes data segments numbered 2 through 5. Data segments 2 through 4 have been previously sent in packet 401 and are being sent in packet 402 as a duplicate based on the redundancy level (e.g., redundancy level requested in 206 of FIG. 2). After packet 402 is sent, packet 403 is sent then packet 404 is sent. The pattern of packets and included data segment numbers will be continued and sent in subsequent packets.

In the example shown, if packet 402 becomes lost, data segments 2 through 5 may be obtained from packets 401 and 403. FIG. 4 shows data segments included in packets in a sequentially increasing order. In some embodiments, data segments may be included in the packets in a sequentially decreasing order. For example, packet 402 may include data segments in the order 5, 4, 3, 2. In some embodiments, rather than delaying sending packets, three packets may have been sent prior to packet 401 being sent. For example, a first packet including data segment 1, a second packet including data segments 1 and 2, and a third packet including data segments 1, 2, and 3 may have been sent prior to sending packet 401.

Returning back to FIG. 3, in some embodiments, in order to adjust the redundancy level, the encoding bit rate may be modified. For example, when the redundancy level is increased, the bandwidth requirement is increased and in order to conserve bandwidth, encoding of the data to be sent may be modified. In another example, when the redundancy level is decreased, the bandwidth requirement is decreased and in order to increase encoding quality of the data, encoding of the data to be sent may be modified. In some embodiments, modifying the encoding includes modifying an encoding bit rate, fidelity, quality, compression rate, and/or resolution of the data being sent. In some embodiments, an available amount of bandwidth is determined and the available bandwidth is divided by the desired redundancy level to determine the encoding required to fit the available bandwidth. In some embodiments, adjusting the redundancy level includes selecting a different encoding scheme and/or protocol. For example, an encoding scheme more optimal for the new redundancy level may be utilized. In some embodiments, encoding quality of the data may be modified equivalently across all redundant copies of the data to be sent. For example, all redundant copies of the data utilize the same encoding quality and/or scheme. In the example shown in FIG. 4, all the data segments included in the shown packets may utilize the same encoding quality and/or scheme.

In some embodiments, encoding quality of the data may not be modified equivalently across all redundant copies of the data segment to be sent. For example, the redundant copies of the same data segment to be sent may be each encoded in two or more different encoding qualities and/or schemes. This may allow a higher fidelity data segment to be utilized, if available, and a lower fidelity data segment to be utilized as a backup. In the example shown in FIG. 4, packet 401 may include a high quality encoding of data segment numbered 1 followed by lower quality encoding of data segments numbered 2 through 4; packet 402 may include a high quality encoding of data segment numbered 2 followed by lower quality encoding of data segments numbered 3 through 5; packet 403 may include a high quality encoding of data segment numbered 3 followed by lower quality encoding of data segments numbered 4 through 6; and packet 404 may include a high quality encoding of data segment numbered 4 followed by lower quality encoding of data segments numbered 5 through 7. Thus if all packets of FIG. 4 are received, the high quality encoding may be utilized for data segments numbered 1 through 4, but if packet 402 is lost, lower fidelity data segment numbered 2 from packet 401 would need to be utilized instead of the higher quality data segment numbered 2 that was included in lost packet 402.

Figure 5:
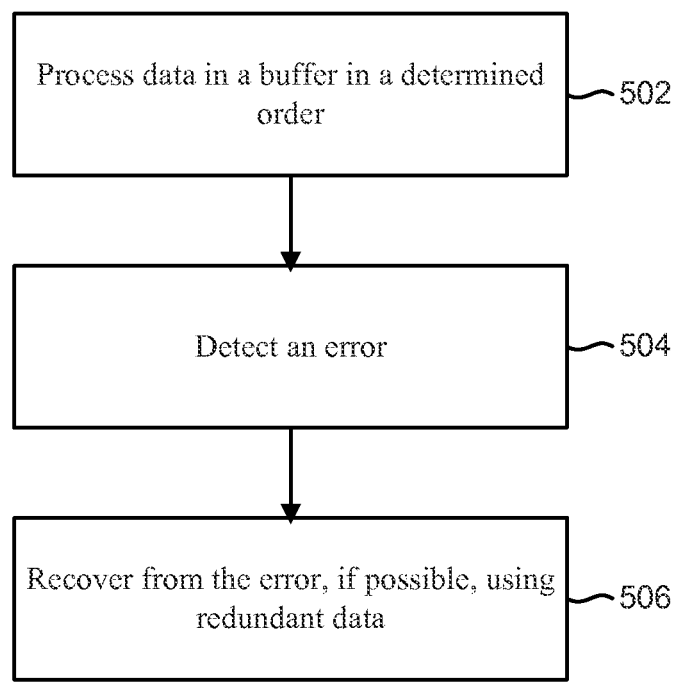
FIG. 5 is a flowchart illustrating an embodiment of a process for handling an error.

FIG. 5 is a flowchart illustrating an embodiment of a process for handling an error. At least a portion of the process of FIG. 5 may be implemented on user device 102, relay server 108, relay server 128, and/or user device 112. For example, the process of FIG. 3 is used by a receiver of data to handle a missing or corrupted packet using a received redundant data.

At 502, data in a buffer is processed in a determined order. In some embodiments, data segments are received from a sender and placed in a buffer at the receiver. For example, data from a live/real-time communication (e.g., network packets of streaming audio data frames) is received and placed in a jitter buffer. In some embodiments, data is received in network packets that include one or more segments of the data. Each network packet may include an order identifier that identifies ordering between network packets. One or more data segments included in the network packet (e.g., as shown in the example of FIG. 4) may be associated with an identifier that identifies ordering between data segments. In some embodiments, as network data packets with one or more data segments are received, the network packets and/or one or more data segments included in the network data packets are placed in the jitter buffer. In some embodiments, changes in redundancy level of a received data may be detected by determining the number of data segments in a received network data packet. For example, the number of data segments in the received network data packet corresponds to the current redundancy level. In some embodiments, changes in redundancy level of a received data may be identified by an identifier included in a header of a received network packet.

In some embodiments, if a redundant data segment that has already been received is received, the redundant data segment may not be placed in the buffer or the previously received data segment may be replaced with the subsequently received redundant data segment. For example, only a signal copy of the same data segment (e.g., all data segments in the jitter buffer have unique sequence identifiers that are greater than an already consumed data segment) that is of the highest received quality/fidelity is stored in the buffer. In some embodiments, received network packets or a data segment(s) included in the network packets are stored in the buffer without prior analysis of whether redundant data is stored in the buffer.

In some embodiments, processing the data includes playing/rendering content of data included in the buffer in a sequence order. For example, the data in the buffer includes live audio communication and audio data frames in a jitter buffer are played/rendered to a user in an identified audio data frame order.

At 504, an error is detected. In some embodiments, detecting the error includes detecting that a network packet has become corrupted and/or is missing. For example, a network packet that is to include a next audio data frame to be played/rendered is determined to be corrupted or missing. In another example, it is determined that data to be stored in a buffer is corrupted or missing.

At 506, the error is recovered, if possible, using redundant data. For example, redundant data provided in 306 of FIG. 3 is used to recover from the error. In some embodiments, recovering from the error includes obtaining desired data (e.g., data segment required to be played/rendered currently in real-time) from a redundantly provided data (e.g., from an alternative network packet that included the desired data segment). The redundant copy of the data may be of a lower quality/fidelity/resolution than the data that has become corrupted/lost due to the error. In some embodiments, the redundant data may not be available and the error cannot be recovered. In some embodiments, obtaining the redundant data includes obtaining the redundant data from the buffer. In some embodiments, obtaining the redundant data includes obtaining the redundant data from a received network data packet that includes the redundant data.

Communicating Control Information

For a variety of reasons, network packets can also become lost when being transmitted between the sender and the receiver. For example, devices (e.g., routers) that select which of many paths to use to transmit the packets may become too busy to process all the packets, and may drop some Links may fail, and packets that were already directed to that link may not be delivered. Noise or electrical interference may cause the packet to be corrupted, and the corrupted packet will be discarded somewhere between sender and receiver.

Historically, there have been a number of approaches to detecting and handling the loss of packets in real-time streams. These alternatives have included providing a "reliable" transport mechanism, such as that provided by Transmission Control Protocol (TCP). In this model and others like it, various mechanisms are used to track packets transmitted and received by both sides of the stream, and when packets are detected as having been lost or excessively delayed, these packets are retransmitted. Often, the application is not presented subsequent packets until the lost packet has been retransmitted and received. Such mechanisms can be very effective in correcting the effects of a bad network for loss-tolerant (non real-time) applications.

In other cases, the loss of a few packets can be tolerated. Real-time streaming of data such as audio, video, and other multimedia data is often time-sensitive in nature, and if data packets cannot be delivered in a limited window of time, the loss of some data packets may be tolerable. For example, losing a fraction of a second of audio during a radio transmission or a phone call is often little more than an annoyance. While actions may be taken to reduce the likelihood future packets being lost, for such applications, the application will often forgo asking that a packet be retransmitted. These applications are called "loss-tolerant" applications, and include real-time applications such as streaming audio and video, as well as audio and video communication. Loss-tolerant applications may still try to reduce the impact of lost packets, or try to take actions to reduce the likelihood of packets being lost.

In some cases utilizing mechanisms that detect lost packets and wait for them to be retransmitted can be harmful for loss-tolerant (real-time) applications. Because packets must be retransmitted, and this may cause delay in newer packets being sent, the stream can be delayed so long that the information is no longer delivered in a timely fashion. As an example, during a voice call such as a voice over internet protocol (VoIP) call, if a transient network failure causes a delay of several seconds for retransmission, an unacceptable delay in a conversation may be noticed.

If the packets are retransmitted on demand, but the application is not forced to wait for the retransmitted packets, there is still a problem. By the time the loss of a packet is detected, the actual information may no longer be valid, and in fact, may be troublesome. Again, referring to the example of a VoIP call, a lost packet might result in a small gap in a conversation. If that packet is retransmitted several seconds later and played at that point, the short burst of audio from earlier in the conversation would prove jarring.

In some embodiments, a real-time communication connection and protocol are used to handle lost packets for real-time streaming of data. In some embodiments, additional, redundant copies of the information being used to encode the real-time information are transmitted along with the original copy. For example, in the simplest form, a duplicate copy of every packet of information might be created and sent to the other party. If a packet is lost, but the duplicate is not, the duplicate is used in place of the missing packet. This packet is not sent when loss is detected, but rather at all times. In theory, as many as half the packets can be lost (assuming they are the right packets) and the message still retrieved. More resilience against lost packets can be achieved by increasing redundancy (e.g., sending two, three, or more copies of the duplicate packet), at the expense of using more network capacity or bandwidth. For example, more than half of the packets can theoretically be lost. Less resilience against loss can be achieved with the advantage of lower utilization of network capacity or bandwidth using schemes such as a XOR/parity mechanism, which send partial copies of the data and protect against the loss of some (smaller) number of packets. In these approaches, losses of a third, quarter, or less of the packets can be tolerated, but less bandwidth is wasted.

In some embodiments, the quality of the audio being sent is reduced if lost packets are detected, by mechanisms such as changing the encoding technique, sampling rate, or bit rate. Lower quality streams use less data, reducing the overall load on the network. In some cases, with the network less loaded, fewer packets will be lost. A lower quality, but more complete stream may be preferable. In some embodiments, the number of streams is reduced, for example, by dropping video from a video call, or changing from multi-channel or stereo sound to monaural sound.

In some embodiments, real-time connections are utilized for one- or two-way audio communication (e.g., phone, VoIP, audio conference, streaming radio, streaming music, etc.) and/or one or two-way video communication (e.g., video chat, video conference, video phone, streaming video, streaming movies, streaming television, etc.). For these applications, the actual media (e.g., real-time stream of data) to be transmitted may be encoded into a format that is easily created, replayed, and manipulated by computer systems. In streaming applications, the data may be captured in real-time from microphones and/or cameras to be transmitted to the remote party or parties. Various techniques can be used to encode or represent the audio or media data digitally and encode it as packets for transmission. A specific technique may be selected to balance quality, tolerance of loss, size of the resulting data stream, etc. Example encodings (also sometimes called formats, codecs, or profiles) include G.711, G.729, various MPEG standards, OGG, WAV, PCM, etc.

In some embodiments, a real-time communication protocol is utilized. For example, RTP, Real-Time Messaging Protocol (RTMP), Dynamic Adaptive Streaming over HTTP (DASH), and/or Session Description Protocol (SDP) may be utilized. SDP may be carried by a signaling protocol (e.g., Session Initiation Protocol (SIP)). In some embodiments, DASH allows real-time data to be segmented and transmitted over conventional HTTP connections.

RTP is a protocol that defines how to transport real-time data between two locations. It is primarily defined in the Internet Engineering Task Force (IETF) RFCs 3550 and 3551, with numerous additional extensions and enhancements documented in other documents. RTP defines how to encapsulate the packets or frames of real-time data, and provides a number of headers that help describe the data. Among the information that can be specified in fields of a RTP packet includes: the type of data (payload type), which defines what encoding or codec is used/being sent; timestamps indicating the time various packets were sent; sequence numbers to identify the order of the packets and track lost packets; information about the source; and information that helps synchronize multiple streams (e.g., two audio streams for stereo, or video and audio streams that should be correlated).

The RTP standard specifies that control information of a connection utilizing RTP is to be sent using a different protocol—RTCP (RTP Control Protocol). RTCP is intended to be utilized to send information alongside the real-time streams, but using a different communications channel or stream. That is, it is an "out-of-band" communications mechanism. RTCP may be utilized to send periodic reports back and forth, allowing senders and receivers to understand how well the information is flowing between them. These statistics can be used to adjust the flow of information to account for slow network connections, lost packets, overwhelmed receivers, etc., and may also be used to determine the likely quality of the user experience. In various embodiments, many actions can result in response to an RTCP report. For example, actions such as increasing or lowering quality of the source to change network use, or increasing or decreasing redundancy in response to lost packets may be implemented.

Unfortunately, because control information is provided out of band, it is often stripped by intermediate devices in the network such as network address translators (NATs), firewalls, or other security devices. In some cases, the raw real-time data in the RTP stream of a real-time communication channel will be allowed to traverse the network, but the RTCP traffic in a different communication channel will be stripped. In other cases, devices either do not generate or do not accept and understand the RTCP events, due to a desire to simplify, short cuts in development, etc. Each device traversed increases the likelihood this information will not reach end-to-end. In modern network deployments, information may pass through several such intermediaries. Additionally, because the information is frequently lost, and using it requires implementing a second communication channel of information, many devices (both sender and receiver) simply have not implemented RTCP, and the real-time data is sent using RTP, but without the accompanying RTCP control data. In these cases, sender and receiver are unable to exchange information about the quality of the transmitted stream. As such, despite mechanisms allowing for intelligent, adaptive redundancy and similar quality control mechanisms being defined for use between sender and receiver (e.g., determining when packets are being lost, and increasing or decreasing redundancy in response), often in practice real-time connections have no redundancy or fixed redundancy, resulting in poor quality, non-optimal network utilization, or both.

Additionally, even when RTCP is used and the out-of-band information is not stripped before reaching the remote party, the process of monitoring the quality of the streams, and packaging this information in periodic RTCP reports can be complex may introduce prohibitive computational overhead. The periodic nature of RTCP reports may introduce delay into decisions about stream quality, and it is often up to the sender to decide how to respond to these reports. While the flexibility provided by separate RTCP sessions providing periodic reports is desirable, it also is very complex, error-prone, and may not work in all environments.

In some embodiments, loss of packets of real-time streaming connection (e.g., carrying video, audio, sensor, gaming, Internet of Things data, etc.) is detected and the loss is reported in-band to a remote party via the real-time streaming communication channel. The communication between parties of the real-time streaming communication channel may utilize the report to adaptively adjust the quality of the communication channel (e.g., by adjusting the level of redundancy or quality of the transmission, lock the quality when required, or to trigger actions that help with synchronization or diagnostics). By communicating control information "in-band" (e.g., not requiring an additional communication channel to coordinate the adaptation), existing networking standards are leveraged to convey the control information.

Figure 6:
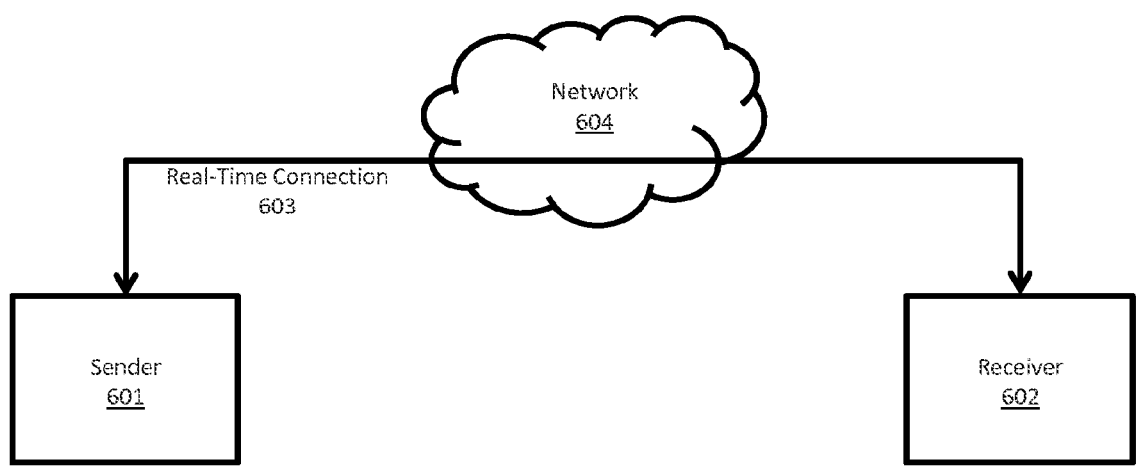
FIG. 6 is a block diagram illustrating an example of a real-time streaming connection.

FIG. 6 is a block diagram illustrating an example of a real-time streaming connection. Sender 601 and receiver 602 are connected using a real-time streaming connection 603 via network 604. In various embodiments, sender 601 and receiver 602 may be any device/server shown in FIG. 1. Real-time streaming connection 603 is utilized to transmit information between Sender 601 to the Receiver 602 in real-time (e.g., sensitive to delay, delivery time, etc.). For example, the real-time information could be a phone call data (e.g., the sender's voice being sent to the receiver), but could be many other kinds of information, including video information, game information (e.g., position of a character, information about actions taken, etc.), real-time information from sensors or other devices in a device network (e.g., "Internet of Things"), or many other types of time critical information.

For simplicity, FIG. 6 shows the flow from a sender to receiver, but one skilled in the art would understand that such a system could (and in fact often would) be implemented symmetrically by both sides, providing a system that supports a bi-directional flow, or involves multiple senders and/or receivers (one-to-many or many-to-many flows). That is, the role of sender or receiver is a logical, not absolute one. Real-time streaming connection 603 may be bi-directional. The terms sender and receiver in this context are used to designate who is sending or receiving each real-time stream, not as a limitation on the ability of either party to exchange information over network 604. In some embodiments, network 604 is network 120. One or more of the following may be included in network 604: a direct or indirect physical communication connection, mobile communication network, Internet, intranet, a packet-switched data network, Local Area Network, Wide Area Network, Storage Area Network, a wireless network (e.g., Wi-Fi, Bluetooth, etc.), a cellular network, PTSN, and any other form of connecting two or more systems, communication devices, components, or storage devices together.

Figure 7:
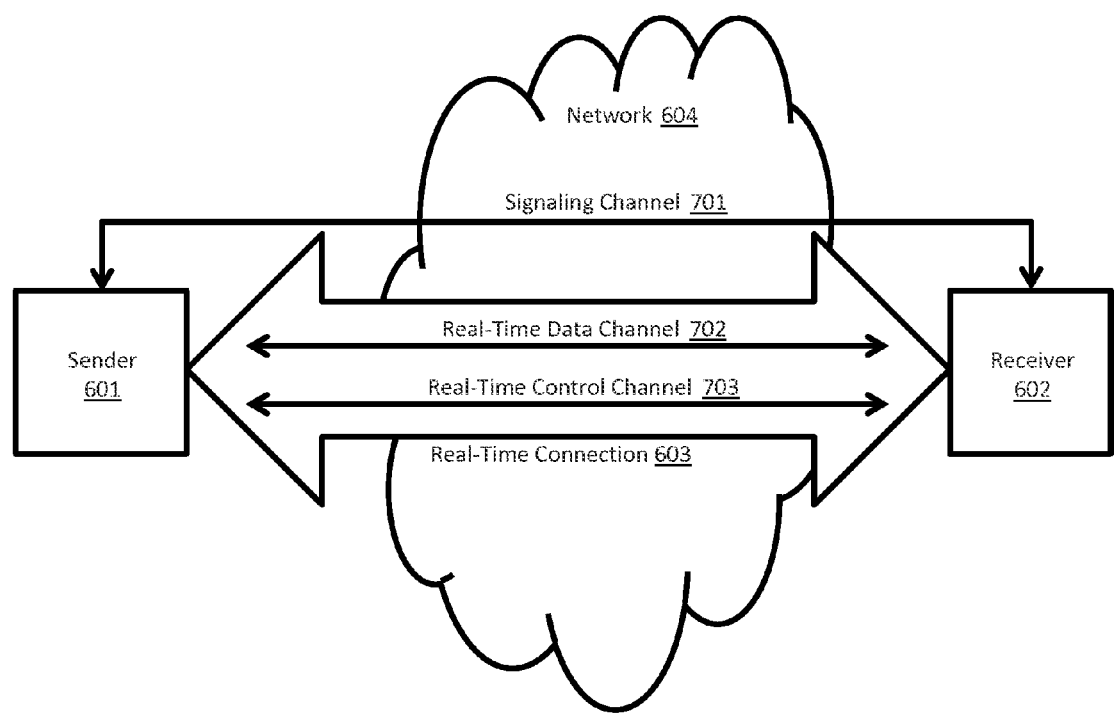
FIG. 7 is a block diagram illustrating an example of real-time streaming connection components.

FIG. 7 is a block diagram illustrating an example of real-time streaming connection components. For example, FIG. 7 shows channel components of real-time streaming connection 603 shown in FIG. 6. In some embodiments, prior to the transmission of the real-time stream of data, signaling information is exchanged between sender 601 and receiver 602 over logical signaling channel 701 to negotiate and establish the real-time streaming data channel(s) (e.g., channel 702) and corresponding control channel(s) (e.g., channel 703). For example, the signaling information includes information describing the type of information that will be exchanged for each channel, how it is encoded, security information associated with the real-time information, information defining the locations (e.g., IP addresses and ports) that the information will be sent between, etc.

In some embodiments, real-time streaming connection 603 includes more than one real-time streaming data channel (e.g., more than one session or flow). In some embodiments, for each flow of information to be exchanged, a channel will be negotiated over signaling channel 701. For example, a bi-directional phone call may require two channels—one for each direction (e.g., as well as two additional channels for control as described below). Similarly, a video call may need a channel each for video and for audio, or potentially multiple channels for stereo or multi-channel audio, multi-camera configurations, etc. Although signaling channel 701 is shown as not included in connection 603, in other embodiments, signaling channel 701 is included in connection 603.

Once the connection setup/signaling information is exchanged over signaling channel 701, the actual exchange of real-time streaming data may occur only over the logical real-time data channel(s) 702. In some embodiments, the real-time streaming data is communicated in the form of Real-Time Transfer Protocol (RTP) messages.

Control information (e.g., information informing each side if messages are being received properly and potentially adapting if not—requesting changes in transmissions rates, changes in redundancy, etc.) may be conveyed in the form of Real-Time Transfer Control Protocol (RTCP) messages, used to control the corresponding real-time data channel 702.

Additional logical real-time control channel(s) 703 may be established for each session prior to sending data. For the example of a two way phone call, requiring two sessions as described above, an additional control session in each direction will be established (for a total of four sessions—two over real-time data channel 702 to carry the real-time data, and two over real-time control channel 703 to exchange control information for the corresponding channel). When a change in control, for example a change in redundancy or encoding quality (as discussed below) is required, requests to either side to change the redundancy level may be sent over the real-time control channel(s) 703.

When control information is provided via a communication channel 703 that is separate from real-time streaming data channel 702, communication channel 703 may become stripped by intermediate devices in the network such as network address translators (NATs), firewalls or other security devices. Because the control information of communication channel 703 is frequently lost, many devices (both sender and receiver) may not be configured to utilize the control information even if control information is successfully communicated. In these cases, sender and receiver are unable to exchange information about the quality of the transmitted stream. As such, despite mechanisms allowing for intelligent, adaptive redundancy and similar quality control mechanisms being defined for use between sender and receiver (e.g., determining when packets are being lost, and increasing or decreasing redundancy in response), often in practice real-time connections have no redundancy or fixed redundancy, resulting in poor quality, non-optimal network utilization, or both. While the flexibility provided by separate RTCP sessions providing periodic reports is desirable, it also is very complex, error-prone, and may not work in all environments.

In an alternative embodiment, real-time control channel(s) 703 is not utilized or established. Instead, control data between sender 601 and receiver 602 is sent directly over real-time data channel(s) 702, negating the need for the real-time control channel(s) 703. For example, if a receiver determines that it needs to increase or decrease the amount of redundant information being transmitted (determined, for example, by the number of packets being lost), rather than sending the request to change the redundancy rate over real-time control channel(s) 703, this is sent directly over the real-time data channel(s) 702 using specially marked packets.

Figure 8:
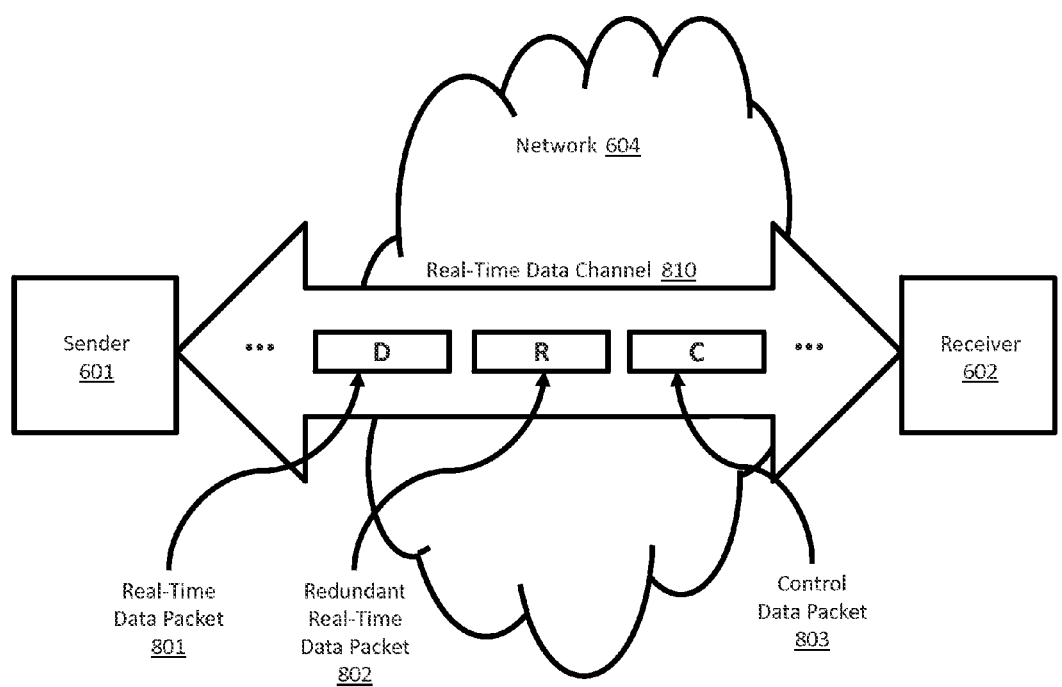
FIG. 8 is a block diagram illustrating an example of real-time streaming data channel components.

FIG. 8 is a block diagram illustrating an example of real-time streaming data channel components. For example, real-time streaming data channel 810 is real-time streaming data channel 702 shown in FIG. 7. In some embodiments, real-time streaming data channel 810 is a component data channel of a connection that may include one or more real-time streaming data channels but does not include a control data channel.

Real-time streaming data packet 801 includes at least a portion of streaming data contents in its payload. Packet 801 may be marked with a payload type identifier (e.g., includes the identifier in a type field of a header of the packet) that identifies that packet 801 includes the streaming data content. Redundant real-time streaming data packet 802 includes in its payload a redundant copy of at least a portion of the data being streamed. Packet 802 may be marked with a payload type identifier (e.g., includes the identifier in a type field of a header of the packet) that identifies that packet 802 includes redundant content used for error correction. Control data packet 803 includes control data of the real-time stream. Packet 803 may be marked with a payload type identifier (e.g., includes the identifier in a type field of a header of the packet) that identifies that packet 803 includes control data. The marked identifier of packet 803 may be an identifier that is not already specified and/or reserved by the official standards of a real-time streaming protocol. For example, the IETF standard of RTP may specify payload types to be utilized for RTP packets and the payload identifier of packet 803 is selected to be not a type identifier otherwise specified in the RTP standard specification.

In various embodiments, various control information, including the ability to increase or decrease redundancy, trigger diagnostic actions, or change encoding rates or quality can be specified in packet 803. Although each different payload has been shown as being provided in distinct packets for conceptual purposes in the example of FIG. 8, various protocol mechanisms exist through which the payloads may actually be combined into one packet or message when actually transmitted over the wire. Certain networks, desiring smaller packet sizes for various reasons (e.g., performance), may split one payload into multiple packets and/or combine them in different ways.

Figure 9:
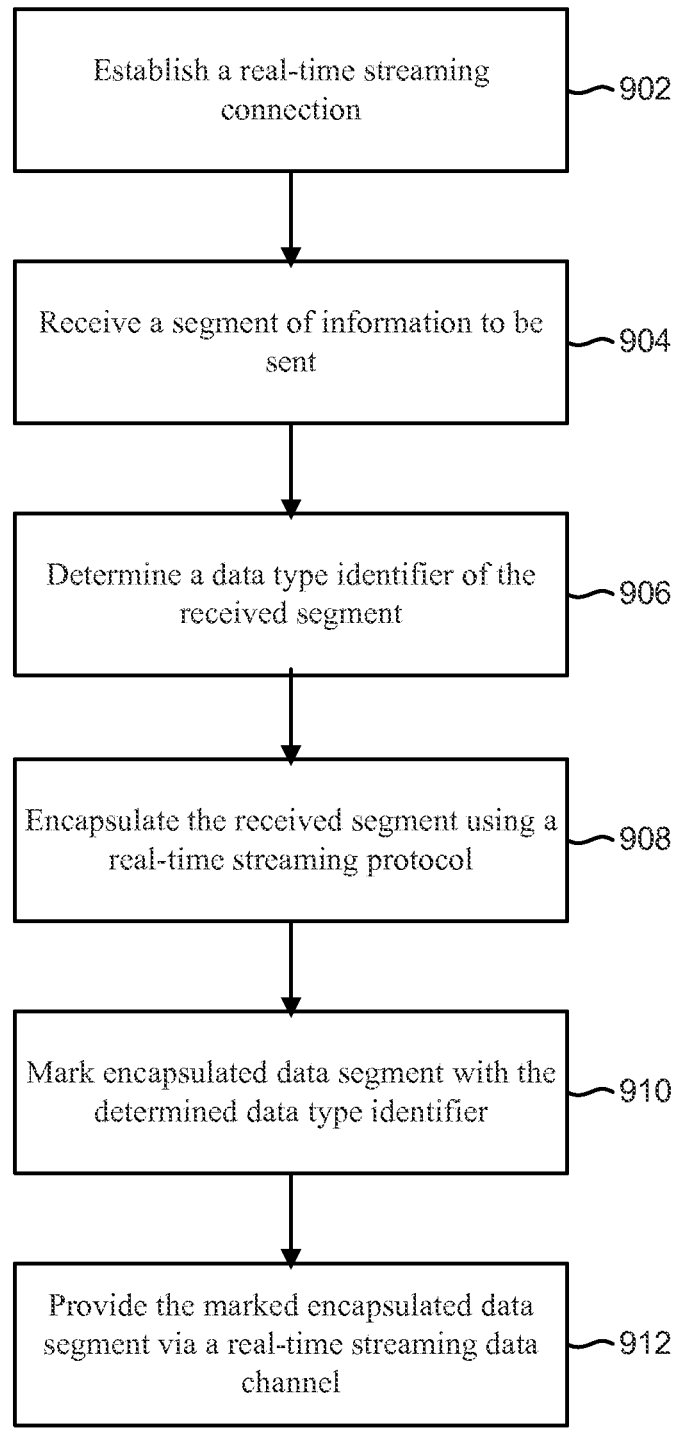
FIG. 9 is a flowchart illustrating an embodiment of a process for providing data via a real-time streaming channel.

FIG. 9 is a flowchart illustrating an embodiment of a process for providing data via a real-time streaming channel. The process of FIG. 9 may be implemented on sender 601 and/or any device shown in FIG. 1. A portion of the process of FIG. 9 may be included in 206 of FIG. 2, 302, and/or 306 of FIG. 3.

At 902, a real-time streaming connection is established. In some embodiments, prior to the transmission of the real-time stream of data, setup signaling information is exchanged between a sender (e.g., sender 601) and a receiver (e.g., 602) over a logical signaling channel (e.g., channel 701) to negotiate and establish a real-time data channel (e.g., channel 810). For example, the setup signaling information includes information describing the type of information that will be exchanged for each channel, how it is encoded, security information associated with the real-time information, information defining the locations (e.g., IP addresses and ports) that the information will be sent between, etc. In some embodiments, the setup signaling information includes a specification that control information will be provided via the real-time data channel rather than via a separate control channel. The payload type identifier that identifies control data may also be provided in the setup signaling information. The established real-time streaming connection is configured to carry real-time streaming data. For example, the carried video, audio, sensor, gaming, Internet of Things data, and/or other delivery time-sensitive data is to be streamed via the established real-time streaming connection.

In some embodiments, the initial signaling information is provided using Session Description Protocol (SDP) information carried by Session Initiation Protocol (SIP) messages. However, one skilled in the art will immediately recognize there are other mechanisms that can be used to signal and establish real-time streaming connection 603. For example, other alternatives could include a Real Time Streaming Protocol (RTSP) and Real-Time Communication in WEB-browsers (RCTWeb), as well as other protocols.

In some embodiments, SIP INVITE messages are exchanged between the party initiating the connection and the party to which it is targeted. The inviting party may include in the SIP messages initiating the real-time data stream, the location(s) where the invited party should send signaling information and real-time information such as media and media control (e.g., including a hostname and/or IP address, along with the port where this information will be sent). In some embodiments, the setup signaling messages may include a list of valid encoding formats understood by/supported by the inviting party. For example, this information is encoded directly in pre-defined headers within a SIP message, while some are encoded in SDP messages carried by SIP. In some embodiments, the sender replies with SIP responses (e.g., 100 TRYING, 180 RINGING, and/or 200 OK) to establish the session if the invited session is accepted. For bi-directional connections, these responses may include the corresponding hostname and/or IP addresses and ports where real-time data should be sent to the invited party, as well as available encodings the invited party supports. This transaction of SIP messages may establish the real-time data channel (e.g., channel 702).

At 904, a segment of information to be sent is received. In some embodiments, data to be provided via a real-time data channel is received. For example, streaming content (e.g., video, voice, audio, sensor, gaming, Internet of Things data, etc.) to be provided via real-time data channel 810 is received. In another example, control data is received. Examples of control data include connection/channel status information, network performance metrics, system performance metrics, a command, an instruction, a request, a configuration, and metadata. In some embodiments, the segment of information is data to be included in a packet.

At 906, a data type identifier of the received segment is determined. The data type identifier may be identified by the provider of the segment received in 904. In some embodiments, determining the data type identifier includes determining a data packet payload type identifier to be included in a header of a packet (e.g., identifier to be included in a PT field of an RTP packet header). For example, a real-time streaming protocol that is designed to carry a range of encoding formats allows a specification of an identifier for each chunk of data (e.g., packet) that maps to a profile (e.g., audio, video, etc.)/format (e.g., encoding formats G.711, G.723, G.726, G.729, GSM, QCELP, MP3, DTMF, etc. for audio and H.261, H.263, H.264, MPEG-4, etc. for video) corresponding to codecs/formats utilized to encode payload data. Certain identifiers may be defined and/or reserved by the streaming protocol for specific defined/reserved use. In the event the received segment is identified to include a type of data that is defined by the real-time streaming protocol standard, the protocol standard defined identifier for the specific type is determined as the data type identifier. In some embodiments, the data type identifier identifies that the received segment is a redundant segment (e.g., to be provided for error correcting) of an already provided data.

In the event the received segment is identified to include control data, the data type identifier is determined to be a control data type identification. For example, although a real-time streaming protocol defines a streaming data channel to carry streaming data contents rather than control data (e.g., standard defines control data to be carried in a separate channel), the real-time streaming data channel is configured to carry the control data by identifying/marking the control data contents with a special data type identifier. The data type identifier for the control data may be an identifier that is not already specified and/or reserved by the standard specification of a real-time streaming protocol.

In some embodiments, RTP allows packets to be marked in an RTP payload type field of an RTP packet. For example, the RTP payload type field is defined as a 7 bit field "PT" in the RTP standard specification, as defined in RFC 2198. For example, particular values for the RTP payload type PT are used to mark the format of original streaming data, another value is utilized to mark control data, and a different value is used to mark redundant data if present.

In some embodiments, determining the data type identifier includes determining an identifier to be included in a Payload Type (i.e., "PT") field of an RTP packet header. In some embodiments, because the RTP standard specification mandates that any device seeing an RTP packet with a payload type (PT) that it does not recognize should ignore the packet, the specially marked packets including control data can safely be sent to devices that do not support "in-band" control data, and the control data packet will simply be discarded if the receiver does not support "in-band" control data.

At 908, the received segment is encapsulated using a real-time streaming protocol. In some embodiments, encapsulating the received segment includes including at least a portion of the received segment in a packet formatted using the real-time streaming protocol. For example, the received segment is encapsulated in an RTP packet. In some embodiments, the received segment is encoded in another control data protocol/format (e.g., RTCP) prior to being encapsulated in a real-time streaming data protocol (e.g., RTCP data is included in an RTP packet).

At 910, the encapsulated data segment is marked with the determined data type identifier. For example, the determined data type identifier is included in a header of the encapsulated data segment. In some embodiments, the determined data type identifier is included in a Payload Type (i.e., "PT") field of an RTP packet header.

At 912, the marked encapsulated data segment is provided via a real-time streaming data channel. For example, the real-time data channel is a data channel utilized to provide streaming contents. In some embodiments, the real-time streaming data channel is real-time data channel 810 shown in FIG. 8.

The process of FIG. 9 may be repeated for additional data segments to be sent. The process may end when a real-time streaming data connection and/or channel is destroyed and/or there does not exist a data segment to be provided.

Figure 10:
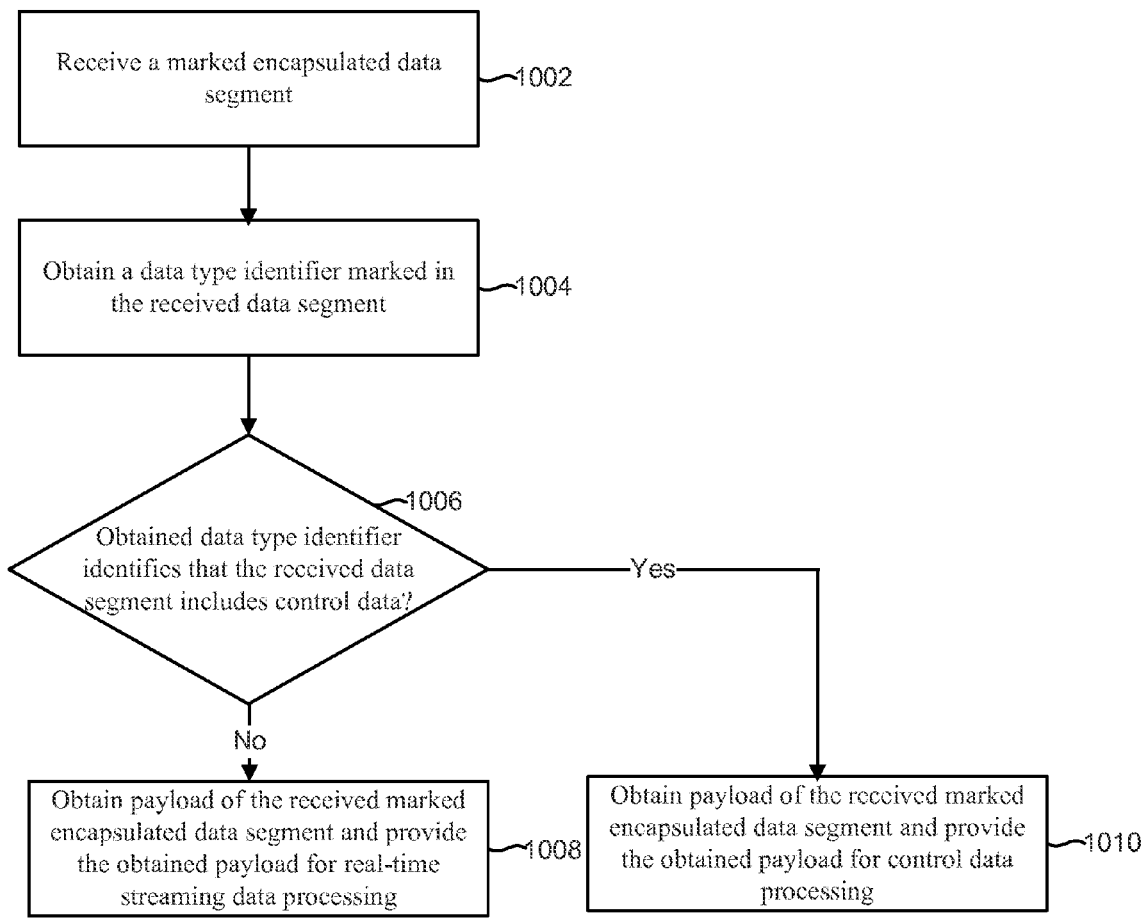
FIG. 10 is a flowchart illustrating an embodiment of a process for receiving and processing data via a real-time streaming channel.

FIG. 10 is a flowchart illustrating an embodiment of a process for receiving and processing data via a real-time streaming channel. The process of FIG. 10 may be implemented on receiver 602 and/or any device shown in FIG. 1. A portion of the process of FIG. 10 may be included in 206 of FIG. 2 and/or 304 of FIG. 3.

At 1002, a marked encapsulated data segment is received. For example, an RTP packet is received. In some embodiments, the content provided in 912 of FIG. 9 is received. In some embodiments, the marked encapsulated data segment is received via a real-time streaming data channel. For example, the data segment is received via real-time data channel 810 shown in FIG. 8.

At 1004, a data type identifier marked in the received data segment is obtained. In some embodiments, obtaining the data type identifier includes extracting the data type identifier from a header of the received marked encapsulated data segment. For example, an identifier specified in the PT field of a header of an RTP packet is obtained. In some embodiments, obtaining the data type identifier includes extracting a payload data included in the received data segment.

At 1006, it is determined whether the obtained data type identifier identifies that the received data segment includes control data. For example, it is determined whether the obtained data type identifier matches a specified identifier for control data.

If at 1006 it is determined that the obtained data type identifier does not identify that the received data segment includes control data, at 1008, the payload of the received marked encapsulated data segment is obtained and provided for real-time streaming data processing. For example, the payload is provided for streaming data processing (e.g., provided for decoding, playing, and/or presenting).

If at 1006 it is determined that the obtained data type identifier identifies that the received data segment includes control data, at 1010, the payload of the received marked encapsulated data segment is obtained and provided for control data processing. For example, the payload data includes transmission and quality of service (QoS) statistics and/or instructions that aid in synchronization of multiple streams and/or error correction/management.

In some embodiments, payload of the received control data segment includes instructions that are relevant to controlling a real-time streaming content. For example, the payload of the received data segment includes an indication to a request to increase or decrease the rate at which redundant information is being provided. For example, specified redundancy levels may indicate no redundancy, a very low-level of redundancy (e.g., using an XOR or similar technique to provide one redundant bit for every N bits), integer levels of redundancy (e.g., duplicating, triplicating, etc. each packet), or other redundancy schemes as received in 304 of FIG. 3.

In some embodiments, payload of the received control data segment includes information that can be used to indicate requests from sender 601 to the receiver 602 to modify content behavior of the real-time channel 810 in response to network conditions, user preferences, etc. One skilled in the art will understand that many parameters can be controlled using this mechanism (e.g., in response to stimuli). For example, the quality of the stream (encoding rate) being sent can be increased or decreased in response to changes in detected bandwidth and/or packet loss or jitter. A different encoding technique can be selected that improves media quality or reduces bandwidth. Video may be instructed to be discontinued in a video call, turning to only audio. Stereo or multi-channel audio may be instructed to be converted to monaural or reduced channel audio, etc.

In some embodiments, payload of the received control data segment includes information that can inform the remote party that a fixed redundancy level is requested. For example, a real-time streaming channel may be used to exchange loss-intolerant information such as facsimile information over a voice channel. Facsimile data may be more sensitive to loss of information during transmission and it may be desirable to set a transmission at high quality or to provide high redundancy levels to ensure lower error rate during transmission. By signaling that facsimile data is being sent, the client may prevent the loss of information by indicating that a high level of redundancy is required, and should not be changed during the duration of the information exchange. While facsimile information is one example, any exchange of loss-intolerant information could also necessitate such a pre-emptive change.

In some embodiments, payload of the received control data segment indicates to a communication party that a real-time streaming channel should be analyzed. The reasons for this analysis could include, but would not be limited to, troubleshooting a poorly-performing connection, responding to a customer complaint, routine performance monitoring, or tracing a failure such as a software or interoperability issue. The receiving party in response may take specific actions (e.g., pre-defined or specified in the payload) such as logging or recording packet streams or supporting information, increasing software debug levels, sending or echoing a test packet, periodically noting system and network performance, etc.

In some embodiments, payload of the received control data segment indicates a request to provide collected diagnostic information. In some embodiments, payload of the received data segment includes diagnostic information. This information may include information associated with packet loss, jitter, latency, ping, traceroute, and/or any other network or non-network diagnostic information that can be utilized to analyze the connection between sender and receiver. While not an exhaustive list, non-network diagnostics information may include available memory, processor utilization, buffer sizes, uptime, system specifications, software versions, etc. Both sides of a communication may provide the diagnostic information to each other to allow one or either party to adjust connection parameters. In some embodiments, payload of the received data segment includes one or more timestamps and time synchronization information. In some embodiments, payload of the received data segment includes a request for retransmission of desired or missing information—either real-time data or control data. In some embodiments, payload of the received control data segment indicates a request to modify an encoding parameter (e.g., encoding rate, encoding format/protocol, encoding technique, etc.). In some embodiments, payload of the received control data segment indicates a request to add or remove content from data being streamed.

The process of FIG. 10 may be repeated for each data segment received.

Although RTP has been utilized through the specification as an example real-time streaming protocol, other real-time streaming protocols may be utilized. Analogous headers, identifiers, flags, specialized packet inspection, techniques, etc. may be utilized. For example, Real-Time Messaging Protocol (RTMP) or Dynamic Adaptive Streaming over HTTP (DASH) may be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing control information, comprising: a processor configured to:
   establish a real-time streaming communication channel with a communication party using a real-time streaming protocol;
   determine that control information is to be provided to the communication party;
   encapsulate the control information using the real-time streaming protocol,
   wherein the control information includes real-time voice or video communications control signaling information; and
   mark the encapsulated control information as including control information content; and
   a communication interface coupled with the processor and configured to:
   provide to the communication party, streaming content via the real-time streaming communication channel using the real-time streaming protocol; and
   provide the marked encapsulated control information via the real-time streaming communication channel.

2. The system of claim 1, wherein the real-time streaming protocol is Real-time Transport Protocol.

3. The system of claim 1, wherein the real-time streaming communication channel is a part of a real-time streaming connection that does not include a separate channel for communicating the control information.

4. The system of claim 3, wherein the control information is encoded using RTP Control Protocol.

5. The system of claim 1, wherein encapsulating the control information using the real-time streaming protocol includes including the control information in a packet formatted using the real-time streaming protocol.

6. The system of claim 1, wherein marking the encapsulated control information includes including an identifier in a packet header of the encapsulated control information.

7. The system of claim 1, wherein marking the encapsulated control information includes including a payload type identifier in a Real-time Transport Protocol packet header.

8. The system of claim 7, wherein the payload type identifier is not defined in a Real-time Transport Protocol standard.

9. The system of claim 1, wherein the streaming content includes audio data.

10. The system of claim 1, wherein the control information includes an instruction to change a redundancy level of the real-time streaming communication channel.

11. The system of claim 1, wherein the control information includes an instruction to lock a redundancy level of the real-time streaming communication channel.

12. The system of claim 1, wherein the control information includes a request for diagnostic information.

13. The system of claim 1, wherein the control information includes a synchronization timestamp.

14. The system of claim 1, wherein the control information includes a request to resend data.

15. The system of claim 1, wherein the control information includes a request to modify an encoding parameter of the real-time streaming communication channel.

16. The system of claim 1, wherein the control information includes a request to add or remove a communication channel to a connection of the real-time streaming communication channel.

17. The system of claim 1, wherein the control information includes an indication that facsimile data will be provided via the real-time streaming communication channel.

18. The system of claim 1, wherein the control information includes a network performance statistic of the real-time streaming communication channel.

19. A method for providing control information, comprising:
   establishing a real-time streaming communication channel with a communication party using a real-time streaming protocol;
   determining that control information is to be provided to the communication party;
   using a processor to encapsulate the control information using the real-time streaming protocol, wherein the control information includes real-time voice or video communications control signaling information;
   marking the encapsulated control information as including control information content;
   providing to the communication party, streaming content via the real-time streaming communication channel using the real-time streaming protocol; and
   providing the marked encapsulated control information via the real-time streaming communication channel.

20. A computer program product for providing control information, the computer program product being embodied in a non-transitory computer readable storage medium and comprising computer instructions for:
   establishing a real-time streaming communication channel with a communication party using a real-time streaming protocol;
   determining that control information is to be provided to the communication party;
   encapsulating the control information using the real-time streaming protocol, wherein the control information includes real-time voice or video communications control signaling information;
   marking the encapsulated control information as including control information content;
   providing to the communication party, streaming content via the real-time streaming communication channel using the real-time streaming protocol; and
   providing the marked encapsulated control information via the real-time streaming communication channel.

* * * * *